United States Patent
Lucas

(10) Patent No.: US 9,248,590 B2
(45) Date of Patent: Feb. 2, 2016

(54) METHOD FOR PREPARING A POWDER FROM BROWN MACROALGAE AND METHOD FOR FABRICATING RIGID OBJECTS FROM SAID POWDER

(71) Applicant: ALGOPACK, Saint Malo (FR)

(72) Inventor: Remy Lucas, Saint Malo (FR)

(73) Assignee: ALGOPACK, Saint Malo (FR)

( * ) Notice: Subject to any disclaimer, the term of this patent is extended or adjusted under 35 U.S.C. 154(b) by 0 days.

(21) Appl. No.: 14/131,639

(22) PCT Filed: Oct. 29, 2013

(86) PCT No.: PCT/FR2013/052593
§ 371 (c)(1),
(2) Date: Jan. 8, 2014

(87) PCT Pub. No.: WO2014/128362
PCT Pub. Date: Aug. 28, 2014

(65) Prior Publication Data
US 2015/0190950 A1    Jul. 9, 2015

(30) Foreign Application Priority Data

Feb. 20, 2013  (FR) .................................... 13 51467

(51) Int. Cl.
*B29C 43/00* (2006.01)
*C08L 99/00* (2006.01)
*B29C 43/20* (2006.01)
*C08L 89/00* (2006.01)
*B29K 1/00* (2006.01)
*B29L 31/00* (2006.01)

(52) U.S. Cl.
CPC ............ *B29C 43/203* (2013.01); *B29C 43/003* (2013.01); *B29C 43/006* (2013.01); *C08L 89/00* (2013.01); *C08L 99/00* (2013.01); *B29K 2001/00* (2013.01); *B29L 2031/00* (2013.01)

(58) Field of Classification Search
None
See application file for complete search history.

(56) References Cited

U.S. PATENT DOCUMENTS

2010/0272940 A1    10/2010    Shi et al.

FOREIGN PATENT DOCUMENTS

| JP | S6394952 A | 4/1988 |
|---|---|---|
| WO | 2011112115 A1 | 9/2011 |
| WO | 2012114045 A1 | 8/2012 |

OTHER PUBLICATIONS

French Search Report and Written Opinion dated Oct. 29, 2013 for corresponding French Application No. 1351467, filed Feb. 20, 2013.
International Search Report and Written Opinion (with translation) dated Feb. 27, 2014 for corresponding International Application No. PCT/FR2013/052593, filed Oct. 29, 2013.

*Primary Examiner* — Mary F Theisen
(74) *Attorney, Agent, or Firm* — David D. Brush; Westman Champlin & Koehler, P.A.

(57) ABSTRACT

A method is provided for fabricating a rigid object from a powder produced from brown macroalgae treated with weak acids. The powder presents a particle size of between 0.5 and 1.5 millimeters and a residual moisture content of less than or equal to 26%. The method includes a step of thermocompressing the powder into a mold, the powder being brought to a temperature of between 50 and 180° C. and subjected to a pressure of between 10000 and 100000 bar for 50 to 200 seconds. A method is also provided for preparing the powder.

14 Claims, 2 Drawing Sheets

METHOD FOR PREPARING A POWDER FROM BROWN MACROALGAE AND METHOD FOR FABRICATING RIGID OBJECTS FROM SAID POWDER

CROSS-REFERENCE TO RELATED APPLICATIONS

This application is a Section 371 National Stage Application of International Application No. PCT/FR2013/052593, filed Oct. 29, 2013, which is incorporated by reference in its entirety and has not yet published.

FIELD OF THE INVENTION

The field of the invention is that of renewable and biodegradable materials.

More specifically, the invention relates to a method for preparing a powder from brown macroalgae and a method for fabricating rigid objects from said powder.

In particular, the invention finds an application in the production of manufactured products, such as marketing materials, advertising media, signs and telephone casings or plugs.

PRIOR ART

Brown macroalgae, also called Phaeophyceae, constitute the most abundant class of algae in cold or temperate waters across the world.

However, they remain a widely underexploited plant material resource.

Processing brown macroalgae with the goal of extracting the alginate destined for the food processing, pharmaceutical or cosmetic industries, for example, is known.

Methods for extracting active substances acting as plant-protection products in brown macroalgae are also known.

More recently, the production of bioethanol from brown macroalgae by the bacterial fermentation of certain sugars present in algae walls has been proposed.

Therefore, until now brown macroalgae has only been used for the extraction of alginates and certain sulfated fucans contained in algae walls.

Following extraction, the residual sulfated fucans and/or alginates and wall skeletons, formed essentially of cellulose and hemicellulose, currently constitute a waste product for industrial companies that use brown macroalgae, due to a lack of options. The companies should, in particular, ensure storage of this waste and its elimination by composting or land farming, which presents a cost.

Therefore, demand for a solution for reclaiming this waste exists.

For example, substituting part of the synthetic plastic material with material from algae in manufactured plastic products has been proposed in document US2010/0272940.

However, these known techniques for substituting plastic with algae promote the use of microalgae, which is notably richer in cellulose than macroalgae. These techniques also present the disadvantage of only enabling part of the synthetic plastic material to be replaced by algal material.

SUMMARY

An aspect of the present disclosure relates to a method of preparing a powder from brown macroalgae, intended for the fabrication of rigid manufactured objects.

In the context of the invention, "rigid object" is understood to refer to an object that does not fold, is resistant to deformation stresses and that, consequently, may be distinguished from pliable or flexible objects.

Such a preparation method according to the invention comprises the following steps, in this order:

harvesting and washing said brown macroalgae in fresh water or sea water, so as to eliminate sand and any possible shells or rock debris;

treating the brown macroalgae with weak acids, such as acetic acid or citric acid, by immersion of said macroalgae in a weak acid bath and/or spraying the said weak acid onto said macroalgae;

grinding the brown macroalgae;

filtration, so as to extract non-solubilized algae residue, or in other words solid residue;

grinding the residue and then drying the residue for 5 to 48 hours at a temperature of 30° C. and 60° C., so as to obtain a powder with a particle size of between 0.5 and 1.5 millimeters and presenting a residual moisture content equal to or less than 26%.

Thus, the invention proposes the preparation, for the first time, of a raw material in powder form essentially from brown macroalgae.

In addition, it should be noted that the method for preparing a powder according to the invention is particularly simple and economical.

In the scope of the invention, the term "weak acid" is understood in its general sense. Thus, it is an acid that is partially insoluble in water. In a variation of the invention, treating brown macroalgae with acids diluted in water may also be contemplated.

It should be noted that the residue may be dried in an oven, for example a rotary furnace, a drier or a drying chamber. The act of maintaining the temperature of the residue between 30 and 60° C. during the drying phase is particularly advantageous, since the properties of the residue are not altered in this manner.

In addition, the act of lowering the moisture content of the powder below 26% enables it to keep for several months without disintegrating in the event of moisture absorption.

Of course, the drying duration necessary to obtain a powder with a moisture content equal to or lower than 26% depends on the initial moisture content of the residue being dried.

Preferentially, the residue extract presents a moisture content equal to or greater than 30%.

In fact, a too-dry residue risks being transformed after grinding and drying into a non-homogeneous powder.

Advantageously, said macroalgae is chosen from among brown algae from the laminariales order or from the fucales order.

In some cases, it may be a mixture of laminariales and/or fucales.

Preferably, said macroalgae is chosen from among the *laminaria digitata* and *ascophyllum nodosum* species and species from the *fucus* genus.

In variations of the invention, said macroalgae may be from the *laminaria sacchoriza* or *laminaria hyperborea* species or from the *lessonia* genus.

According to a particular aspect of the invention, the residual moisture content of said powder is between 7 and 26%.

In fact, the inventors have observed that a residual moisture content at least equal to 7% provides fluidity to the powder constituent material, which improves its ability to be shaped.

In at least one particular embodiment of the invention, the density of said powder is between 0.4 and 0.8.

A light material is thereby obtained.

According to a particular embodiment of the invention, the method of preparing a powder from brown macroalgae described above comprises a step of adding a dye or color pigments to the residue during the step of grinding the residue in proportions of between 0.5 and 5% by mass of the total mass of the residue.

A product colored in its mass is thereby obtained.

In other embodiments of the invention, whitening the powder by adding an acid, for example bleach, and/or an enzyme during the grinding step and, if necessary, a surface active agent intended to disperse the natural coloring elements of macroalgae, or chloroplasts, may also be provided.

Advantageously, the method of preparing a powder from brown macroalgae described above comprises a step of adding to the residue, during the step of grinding the residue, an odor absorber, such as particles of activated charcoal, zeolite or porous silica, or an odorizing agent, such as vanillin for example, able to eliminate or mask the odor of the residue in proportions of between 0.5 and 5% by mass of the total mass of the residue.

The iodine odor, which may be heavy or disagreeable, is thus removed from the powder.

In a particular embodiment of the invention, the method of preparing a powder from brown macroalgae according to the invention comprises a step of adding albumin to the residue during the grinding step, from 0.3 to 2% by mass in relation to the total mass of the residue.

The rigidity of the powder particles is thereby increased.

The present invention also relates to a method of fabricating a rigid object from a powder produced from brown macroalgae treated with weak acids, said powder presenting a particle size of between 0.5 and 1.5 millimeters and a residual moisture content of less than or equal to 26%.

According to the invention, such a process for fabricating a rigid object from a powder produced from brown macroalgae comprises a step of thermocompressing the powder in a mold, the powder being brought to a temperature of between 50 and 180° C., preferably between 60 and 160° C., and subjected to pressure of between 400 and 4000 bar for 50 to 200 seconds.

The invention thus astutely proposes the formation of rigid objects from compacted algae powder, which is particularly simple and effective. In particular, thanks to the moisture present in the powder, the powder particles may aggregate in a fluid and homogeneous manner and solidly bind together.

It should be noted that the temperature and duration of application of the pressure may be optimized depending on the thickness and size of the object fabricated.

In at least one advantageous embodiment of the invention, the fabrication method described above comprises a step of at least partially applying a water-repellant lacquer onto the surface of the thermocompressed powder.

The body of the object is thereby protected against water absorption.

LIST OF FIGURES

Other characteristics and advantages of the invention will appear more clearly upon reading the following description of an embodiment of the invention, given by way of a simple, non-limiting illustrative example, and of the attached drawings, among which:

Figure 3:
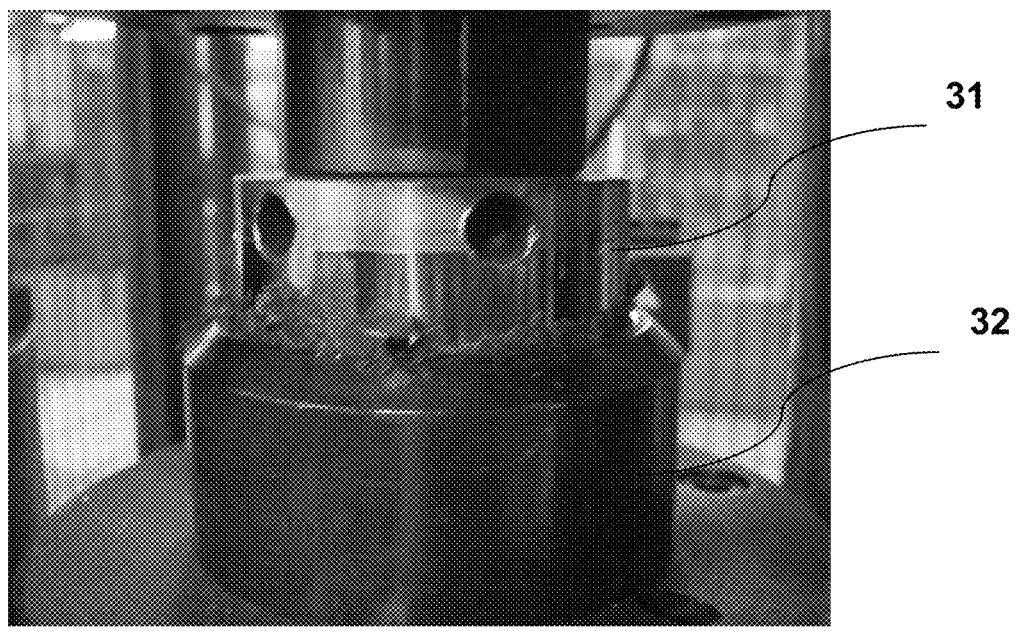
Figure 4:
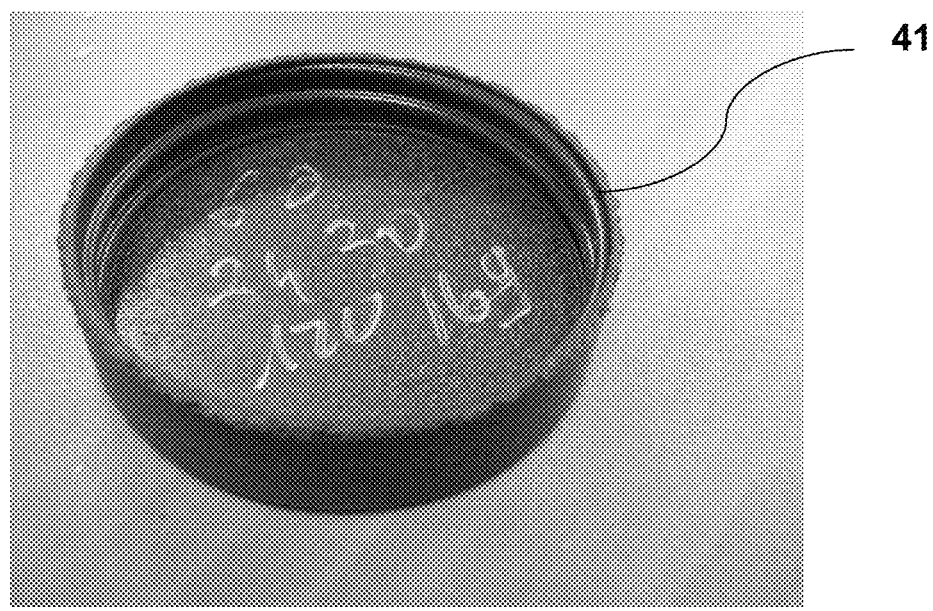

FIG. 3 presents a thermocompression press used to form a plug from brown macroalgae powder;

FIG. 4 is a schematic view of a plug fabricated by thermocompressing brown macroalgae powder by using the press presented with reference to FIG. 3.

DESCRIPTION OF A DETAILED EXAMPLE OF THE INVENTION

Figure 1:
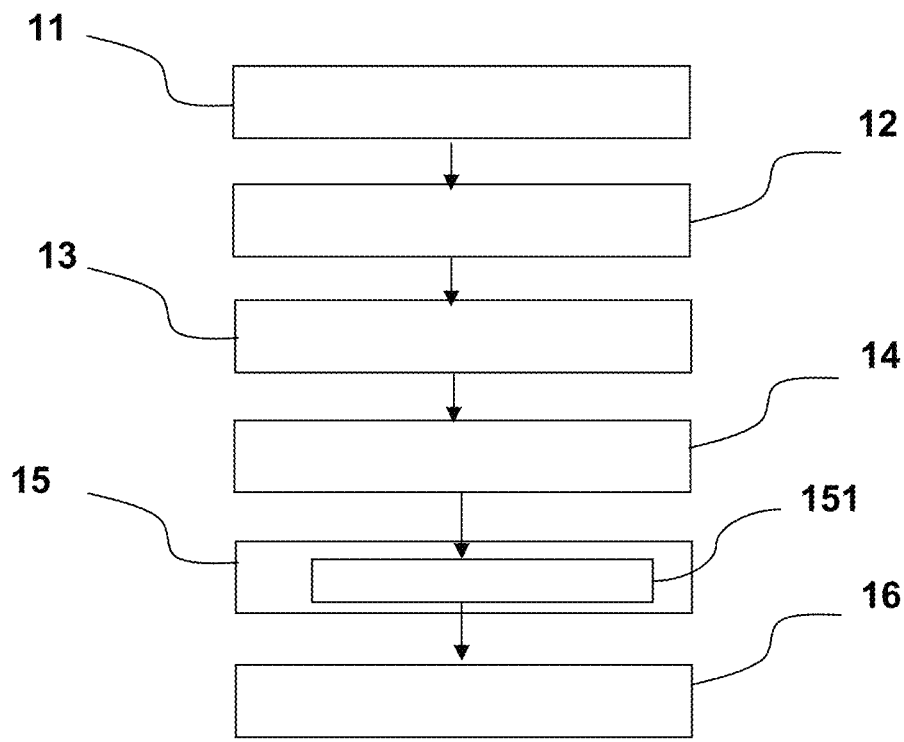
FIG. 1 is a block diagram in the form of a diagram of steps of an example of the method of preparing a powder from brown macroalgae according to the invention.

The steps of an example of a method for preparing a powder intended for the fabrication of rigid manufactured objects from a mixture of *laminaria digitata* and *ascophyllum nodosum*, also called black bladder wrack, are represented in block diagram form in FIG. 1.

After harvesting this brown macroalgae on the foreshore, the macroalgae is transformed on a production line of a powder preparation plant, where the macroalgae is washed by sea water runoff in a first step to remove the sand and shells entangled in the algae thallus (step 11).

The macroalgae is then treated with acetic acid by immersing the macroalgae into an acetic acid bath (step 12).

In this particular embodiment of the invention, approximately 70% by weight of *laminaria digitata* and 30% by weight of *ascophyllum nodosum* is treated.

In other embodiments of the invention, treating only *laminaria digitata* or *ascophyllum nodosum* or a mixture of these two macroalgae species in any respective proportions may be contemplated.

The treated algae is removed and introduced into a cutting mill, where it is crushed and shredded until a we pulp is obtained (step 13).

This we pulp is emptied into a filter strainer, where the acetic acid that is enriched with solubilized organic constituents is evacuated through the strainer mesh in step 14. The solid algae residue thus obtained is retained.

In a variation of this embodiment, a residue of algae treated with weak acid may be obtained from an alginate production plant, in which alginates are extracted by precipitation of solubilized alginic acid salts contained in a leach slurry from a brown macroalgae ground material exposed to an acidic medium. In fact, the residue of algae treated with weak acid constitutes a waste product for these plants.

Utilization of this waste material enables brown macroalgae powder to be prepared at a particularly advantageous price.

In step 15, the solid algae residue is ground and then dried in a hot air drying tunnel for 6 hours at a temperature of 50° C.

When the residue is being ground, 1% by mass, in relation to the total mass of the residue, of activated charcoal fines is progressively added to mask the odor of the residue (step 151).

Figure 2:
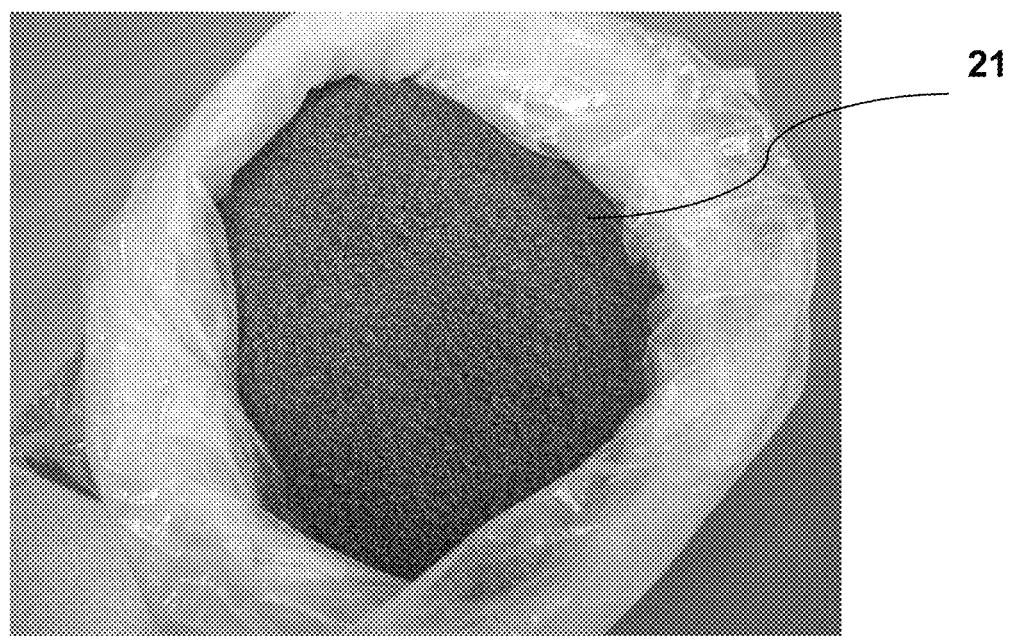
FIG. 2 is a view of a powder obtained by the preparation method presented with reference to FIG. 1.

At the exit of the drying tunnel, the algae powder obtained is transported over a vibrating apertured conveyor belt with a ½ inch mesh size, across which the powder is calibrated in the form of a powder with a particle size equal to 1±0.5 mm, and is then bagged (step 16). FIG. 2 is a top view of an open sachet of powder 21 obtained by the preparation method according to the invention.

Each production line in the plant thus enables approximately 3 tons of powder to be continuously and cost-effectively prepared per hour.

It is noted that in this particular embodiment of the invention, the residual moisture content of the powder is approximately 21%.

The powder thus obtained may be used directly for fabricating manufactured objects.

A thermocompression press 31 developing a pressure of 12 tons/cm² enabling 54 mm-diameter threaded plugs to be fabricated from brown macroalgae powder is illustrated in FIG. 3.

As may be seen in FIG. 3, press 31 presents a piston head equipped with a contact surface heated to 105° C. by induction. To control the fabrication method, the piston contact surface temperature is adjusted.

The powder is dosed automatically by suction flow in lower mold 32 brought to an adjusted temperature of 105° C.

In this example, 16 g of powder is dosed into the mold and a force of 12 tons is exerted onto the powder with the piston head for a cycle time of 120 s, so as to bring the temperature of the powder to approximately 70° C.

A plug 41 with a mass of approximately 14 g schematically illustrated in FIG. 4, in a perspective view, is obtained.

A water-repellant lacquer is then sprayed onto the plug in order to make the plug waterproof.

In the next step, the surface of the plug is decorated by pad printing or by digital printing.

It is noted that, advantageously, when an impression tool is used, the temperature of the impressions is chosen to be between 75 and 110° C.

An exemplary embodiment of the invention provides a raw material that is completely or at least predominantly produced from brown macroalgae that may be implemented to fabricate rigid manufactured objects.

A particular embodiment of the invention offers this raw material in the form of a powder of constant quality and homogeneous properties.

An embodiment of the invention provides a technique for fabricating manufactured objects from brown macroalgae that are simple to implement and reliable.

An embodiment of the invention provides such a fabrication technique with a lower operating cost.

An embodiment of the invention uses a waste product issued from the exploitation of brown macroalgae in industrial sectors.

Although the present disclosure has been described with reference to one or more examples, workers skilled in the art will recognize that changes may be made in form and detail without departing from the scope of the disclosure and/or the appended claims.

The invention claimed is:

1. A method for preparing a powder from brown macroalgae, intended for the fabrication of rigid objects, characterized in that the method comprises the following steps, in this order:
    harvesting and washing the brown macroalgae;
    treating the brown macroalgae with weak acids, by immersion of said macroalgae in a weak acid bath and/or spraying the weak acid onto said macroalgae;
    grinding the brown macroalgae;
    filtration, so as to extract a residue of non-solubilized algae;
    grinding the residue and then drying the residue for 5 to 48 hours at a temperature of 30° C. and 60° C., so as to obtain a powder with a particle size of between 0.5 and 1.5 millimeters and presenting a residual moisture content equal to or less than 26% by mass.

2. The method of preparing a powder from brown macroalgae according to claim 1, wherein the residue extract presents a moisture content equal to or greater than 30% by mass.

3. The method of preparing a powder from brown macroalgae according to claim 1, wherein said macroalgae is chosen from among brown algae from the laminariales order or from the fucales order.

4. The method of preparing a powder from brown macroalgae according to claim 1, wherein said macroalgae are selected from the group consisting of *laminaria digitata* and *ascophyllum nodosum* species and species from the *fucus* genus.

5. A method of preparing a powder from brown macroalgae according to claim 1, wherein the residual moisture content of said powder is between 7 and 26% mass.

6. A method of preparing a powder from brown macroalgae according to claim 1, wherein the density of the powder is between 0.4 and 0.8%.

7. The method of preparing a powder from brown macroalgae according to claim 1, wherein the method comprises a step of adding a dye or color pigments to said residue during the step of grinding said residue in proportions of between 0.5 and 5% by mass of the total mass of said residue.

8. The method of preparing a powder from brown macroalgae according to claim 1, wherein the method comprises a step of adding an odor absorber or odorizing agent to the residue during the step of grinding the residue in proportions of between 0.5 and 5% by mass of the total mass of the residue.

9. The method of preparing a powder from brown macroalgae according to claim 1, wherein the method comprises a step of adding albumin to the residue during the grinding step, from 0.3 to 2% by mass in relation to the total mass of the residue.

10. A method comprising:
    fabricating a rigid object from a powder produced from brown macroalgae treated with weak acids, the powder presenting a particle size of between 0.5 and 1.5 millimeters and a residual moisture content of less than or equal to 26% by mass, wherein fabricating comprises a step of thermocompressing the powder in a mold, the powder being brought to a temperature of between 50 and 180° C., and subjected to pressure of between 400 and 4000 bar for 50 to 200 seconds.

11. The method for fabricating a rigid object according to claim 10, wherein the method comprises a step of at least partially applying a water-repellant lacquer onto a surface of the thermocompressed powder.

12. The method of preparing a powder from brown macroalgae according to claim 1, wherein the weak acid comprises at least one of acetic acid or citric acid.

13. The method according to claim 10, wherein the weak acid comprises at least one of acetic acid or citric acid.

14. The method of claim 10, wherein the powder is brought to a temperature of between 60 and 160° C.

\* \* \* \* \*